Oct. 6, 1964   R. M. ALTMAN ETAL   3,152,212
OPTICAL SYSTEM FOR TELESCOPE
Filed May 16, 1961

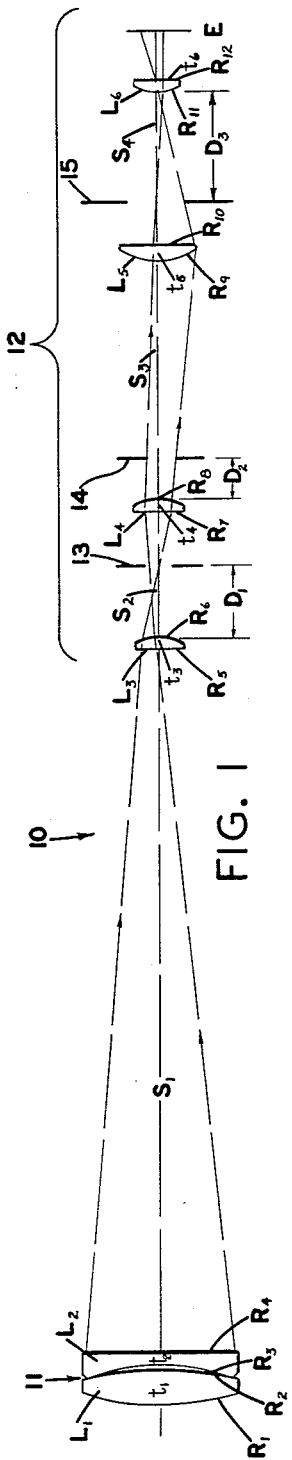

FIG. 2

| LENS | RADII | MAGNIFICATION = 10X | | | |
|---|---|---|---|---|---|
| | | THICKNESS SPACES | $n_D$ | $\nu$ | E.F. |
| $L_1$ | $R_1 = +67.92$ | $t_1 = 6.5$ | 1.517 | 64.5 | 66.777 |
| | $R_2 = -67.92$ | $S_1 = 137.5$ | | | |
| $L_2$ | $R_3 = -66.68$ | $t_2 = 3.5$ | 1.720 | 29.3 | -126.23 |
| | $R_4 = -255.86$ | $S_2 = 24.7$ | | | |
| $L_3$ | $R_5 = \infty$ | $t_3 = 2.0$ | 1.524 | 59.5 | 22.115 |
| | $R_6 = -11.588$ | $S_3 = 47.1$ | | | |
| $L_4$ | $R_7 = \infty$ | $t_4 = 2.0$ | 1.524 | 59.5 | 22.115 |
| | $R_8 = -11.588$ | $S_4 = 29.0$ | | | |
| $L_5$ | $R_9 = 15.849$ | $t_5 = 2.8$ | 1.621 | 36.2 | 25.522 |
| | $R_{10} = \infty$ | $S_5 = 10.0$ | | | |
| $L_6$ | $R_{11} = 11.588$ | $t_6 = 2.0$ | 1.524 | 59.5 | 22.115 |
| | $R_{12} = \infty$ | | | | |

SCALAR QUANTITIES STATED IN MM.

RICHARD M. ALTMAN
HERBERT D. KORONES
*INVENTORS*

BY Frank C. Parker

*ATTORNEY*

United States Patent Office 3,152,212
Patented Oct. 6, 1964

3,152,212
OPTICAL SYSTEM FOR TELESCOPE
Richard M. Altman, Brighton, and Herbert D. Korones, Rochester, N.Y., assignors to Bausch & Lomb Incorporated, Rochester, N.Y., a corporation of New York
Filed May 16, 1961, Ser. No. 110,491
3 Claims. (Cl. 88—57)

The present invention relates to an optical system for telescopes and more particularly it relates to optical improvements in low power telescopes.

It is the object of this invention to provide an optical system for a low cost and low power telescope which is simple in form and construction, said system utilizing easily produced low curvature or plano lens parts in combination with advantageously located and proportioned diaphragm structure, said lens parts being made of optical glass having such optical characteristics that the optical performance of the system far excels the corresponding performance of low cost telescopes now available.

Further objects and advantages of this invention will be apparent from a study of the specification herebelow taken in connection with the accompanying drawing in which:

FIG. 1 is an optical diagram showing an optical system constructed according to the present invention, and FIG. 2 is a chart showing the constructional data relating to said optical system.

The optical system of this invention is intended for a terrestrial type of telescope and is generally designated in the drawing by the numeral 10. Said optical system 10 comprises a positive compound objective lens member 11, which includes a double convex lens element $L_1$ and a concavo-convex lens element $L_2$ located rearwardly thereof. The optical system further comprises a terrestrial or erecting type of eyepiece generally designated by the numeral 12 which is spaced rearwardly of the objective lens member 11 at a distance $S_1$ which is substantially equal to the focal length of the objective lens member, said objective and eyepiece being optically aligned on a common optical axis.

The equivalent focal length of the objective lens 11 is numerically substantially 10 times the equivalent focal length of the eyepiece member 12 which corresponds to an image magnification of 10 times and may be classified as a low power telescope.

For the purpose of producing a low power telescope of minimum cost together with the maximum obtainable optical quality in the image produced thereby, the eyepiece member 12 preferably comprises three singlet plano convex lenses $L_3$, $L_4$ and $L_6$, wherein $L_3$ and $L_4$ are located in the forepart of the eyepiece member 12 and the lens $L_6$ is located in the rearmost position. The eyepiece member 12 furthermore comprises a fourth plano convex lens $L_5$ which is positioned rearwardly of lens $L_4$.

It will be observed that the three lenses $L_3$, $L_4$, $L_6$ are not only shaped and proportioned alike but are also made from the same kind of glass. It is possible therefore in manufacturing to mount these lenses simultaneously on a single lens holding shell so as to grind all the lenses at once whereby the cost of manufacture is reduced to a minimum. The front pair of lenses $L_3$ and $L_4$ are arranged with their plano sides facing forwardly toward the objective lens member 11, and the rear lenses $L_5$ and $L_6$ have their plano sides facing rearwardly.

Functionally the lenses $L_3$ and $L_4$ serve as an erector for the image produced by the objective 11, and the two lenses $L_5$ and $L_6$ serve as an eyepiece for viewing the image formed by the erector lenses, this general arrangement being well known and illustrated in the art. The eyepoint of the instrument is formed rearwardly of the eyepiece section of the telescope at E.

The optical system 10 is designed to provide excellent correction for chromatic aberrations both axially and in the field. Such correction is achieved axially by overcorrection of longitudinal color in the objective lens member 11, whereby the undercorrection of longitudinal color inherent in the terrestrial type eyepiece is compensated, the glass used in the rear element $L_2$ having an $n_D$ value of at least .200 more than the $n_D$ value of the glass used in front element $L_1$. The value of the Abbe number of the glass used in element $L_1$ is at least 35.0 greater than the Abbe number of the glass in element $L_2$.

Another of the reasons for achieving good chromatic imagery in the field of the optical system is afforded by the provision of a high index and high dispersion glass in the lens $L_5$, said index of refraction of the glass being not less than 1.620 and the corresponding dispersion as represented by the Abbe number therefor being not greater than 37.0.

An optimal balance of color correction is achieved by the use of the high index and high dispersion glass in lens $L_5$ to correct for lateral color. The longitudinal color introduced by this lens is compensated by judicious overcorrection of axial color in the objective lens member 11.

A further reason for the achievement of good optical performance to the limits of the field of view of the optical system 10 is the optimal vignetting of the bundle of optical rays, as shown by the ray diagram in FIG. 1. This vignetting is achieved by the provision of the diaphragm 13 which is located between the lenses $L_3$ and $L_4$, the diaphragm 14 which is located between the lenses $L_4$ and $L_5$ and diaphragm 15 which is located between the lenses $L_5$ and $L_6$. For best performance it has been found that the first vignetting diaphragm 13 should be located at a distance rearwardly of the lens $L_3$ of between .100F and .105F, and a diameter of between .029F to .031F where F represents the equivalent focus of objective 11. Correspondingly the diaphragm 14 should be located rearwardly of the lens $L_4$ at a distance between .059F to .064F, and the diameter thereof should be between .032F to .035F.

For the best achievement of good optical performance it has been found that the negative equivalent focal length of the lenses $L_3$, $L_4$ and $L_5$ per se should be substantially $1.6F_E$, and the negative equivalent focus of lens $L_5$ should be substantially $1.84F_E$, wherein $F_E$ represents the equivalent focus of the eyepiece 12. Stated in another manner, the focal lengths $F_3$, $F_4$, and $F_6$ related respectively to the lenses $L_3$, $L_4$, and $L_6$, are all of the same value which is between .15F and .17F. Furthermore the focal length F5 which is related to the lens $L_5$ should be between .17F and .19F.

The spaces between the various lenses are designated $S_1$ between the lenses $L_2$ and $L_3$, $S_2$ between the lenses $L_3$ and $L_4$, $S_3$ between the lenses $L_4$ and $L_5$, and $S_4$ between the lenses $L_5$ and $L_6$. These spaces should be specified according to the following table herebelow:

$$S_1 = .9F \text{ to } 1.1F$$
$$S_2 = .17F \text{ to } .19F$$
$$S_3 = .33F \text{ to } .35F$$
$$S_4 = .20F \text{ to } .22F$$

For the minimum cost of manufacture, the radius $R_1$ of the front element $L_1$ of the objective lens member 11 is equal to the radius $R_2$ of the rear face of said element and these radii have a value of .45F to .53F.

One specific successful form of constructional data for the optical system 10 is given in the chart in FIG. 2 and is specified herebelow:

*Magnification of Telescope=10×*

[Scalar quantities stated in mm.]

| Lens | Radii | Thickness | Spaces | $n_D$ | $\nu$ | E.F. |
|---|---|---|---|---|---|---|
| $L_1$ | $R_1 = +67.92$ $R_2 = -67.92$ | $t_1 = 6.5$ | | 1.517 | 64.5 | 66.777 |
| $L_2$ | $R_3 = -66.68$ $R_4 = -255.86$ | $t_2 = 3.5$ | $S_1 = 137.5$ | 1.720 | 29.3 | -126.23 |
| $L_3$ | $R_5 = \infty$ $R_6 = -11.588$ | $t_3 = 2.0$ | $S_2 = 24.7$ | 1.524 | 59.5 | 22.115 |
| $L_4$ | $R_7 = \infty$ $R_8 = -11.588$ | $t_4 = 2.0$ | $S_3 = 47.1$ | 1.524 | 59.5 | 22.115 |
| $L_5$ | $R_9 = 15.849$ $R_{10} = \infty$ | $t_5 = 2.8$ | $S_4 = 29.0$ | 1.621 | 36.2 | 25.522 |
| $L_6$ | $R_{11} = 11.588$ $R_{12} = \infty$ | $t_6 = 2.0$ | $S_5 = 10.0$ | 1.524 | 59.5 | 22.115 |

It will be observed that there is here provided an optical system for a low powered telescope which is of extremely simple optical construction, wherein the objective 11 is chromatically corrected and wherein the plano convex eyepiece lens $L_5$ is made of dense flint glass. The use of such glass in a lens of positive focal length is unusual and unconventional and its serves to correct the lateral color present in the telescope.

Although only a preferred embodiment of this invention has been shown and described in detail, other forms are possible and changes may be made in the structure of the component parts and the arrangement thereof without departing from the spirit of the invention as defined in the claims here appended.

What is claimed is:

1. An optical system for a low power telescope comprising a compound positive objective lens member having a double convex front element and a concavo-convex rear element, the $n_D$ of the rear element being at least .200 greater than the $n_D$ of said front element and the Abbe number of the front element being at least 35.0 greater than the Abbe number of the rear element, said objective thereby being overcorrected for longitudinal color, whereby the longitudinal color of the entire optical system is reduced to insignificant proportions, said system further comprising an optically aligned terrestrial type eyepiece which is axially separated from said objective member by a distance substantially equal to the equivalent focus of said objective member, said eyepiece comprising four serially arranged plano convex lenses having equivalent focal lengths as given herebelow wherein F represents the equivalent focal length of said objective lens member, $F_1$ and $F_2$ represent the equivalent focal lengths of the lens elements $L_1$ and $L_2$ respectively of the objective member 11, $F_3$, $F_4$, $F_5$ and $F_6$ represent the equivalent focal lengths of the successive plano convex lenses named in order from the front, and $S_1$, $S_2$, $S_3$ and $S_4$ represent the air spaces between the successive lens members, $R_1$ and $R_2$ denote radii of the foremost lens surfaces.

$F_1 = .46F$ to $.51F$
$F_2 = -.89F$ to $-.93F$
$F_3 = F_4 = F_6 = .15F$ to $.17F$
$F_5 = .17F$ to $.19F$
$S_1 = .9F$ to $1.1F$
$S_2 = .17F$ to $.19F$
$S_3 = .33F$ to $.35F$
$S_4 = .20F$ to $.22F$
$R_1 = -R_2 = .45F$ to $.53F$

2. An optical system as set forth in claim 1 characterized by a first vignetting diaphragm located at a distance of .100F to .105F rearwardly of the first plano convex lens and having a diameter of .029F to .031F, and further characterized by a second vignetting diaphragm located at a distance of .059F to .064F rearwardly of the second plano convex lens and having a diameter of .032F to .035F whereby an increase in the depth of focus and a flattening of the field are affected along with improvement in image quality and efficient separation of stray light from the useful image-forming light.

3. An optical system for a low power telescope comprising six lens elements $L_1$ to $L_6$, the elements $L_1$ and $L_2$ comprising a positive objective lens, the elements $L_3$, $L_4$, $L_5$ and $L_6$ comprising a terrestrial type erecting eyepiece, the constructional data therefor being specified in the table herebelow wherein $R_1$ to $R_{12}$ represent the radii of the lens surfaces, $t_1$ to $t_6$ represent the axial thicknesses of said elements, $S_1$ to $S_5$ represent the spaces between the lens elements and the eye distance, $n_D$ represents the refractive index for the D line of the spectrum, $\nu$ represents the Abbe number and E.F. denotes the individual equivalent focal lengths of said elements:

*Magnification=10×*

[All scalar quantities stated in mm.]

| Lens | Radii | Thickness | Spaces | $n_D$ | $\nu$ | E.F. |
|---|---|---|---|---|---|---|
| $L_1$ | $R_1 = +67.92$ $R_2 = -67.92$ | $t_1 = 6.5$ | | 1.517 | 64.5 | 66.777 |
| $L_2$ | $R_3 = -66.68$ $R_4 = -255.86$ | $t_2 = 3.5$ | $S_1 = 137.5$ | 1.720 | 29.3 | -126.23 |
| $L_3$ | $R_5 = \infty$ $R_6 = -11.588$ | $t_3 = 2.0$ | $S_2 = 24.7$ | 1.524 | 59.5 | 22.115 |
| $L_4$ | $R_7 = \infty$ $R_8 = -11.588$ | $t_4 = 2.0$ | $S_3 = 47.1$ | 1.524 | 59.5 | 22.115 |
| $L_5$ | $R_9 = +15.849$ $R_{10} = \infty$ | $t_5 = 2.8$ | $S_4 = 29.0$ | 1.621 | 36.2 | 25.522 |
| $L_6$ | $R_{11} = +11.588$ $R_{12} = \infty$ | $t_6 = 2.0$ | $S_5 = 10.0$ | 1.524 | 59.5 | 22.115 |

References Cited in the file of this patent

UNITED STATES PATENTS

| | | |
|---|---|---|
| 2,489,578 | Hillman | Nov. 29, 1949 |
| 2,804,802 | Loeck | Sept. 3, 1957 |

FOREIGN PATENTS

| | | |
|---|---|---|
| 1,223,147 | France | Jan. 25, 1960 |